United States Patent
Watanabe

(10) Patent No.: US 9,894,738 B2
(45) Date of Patent: Feb. 13, 2018

(54) LIGHT-EMITTING APPARATUS WITH NEAR FIELD COMMUNICATION UNIT, A CONTROL METHOD THEREFOR, AND A NON-TRANSITORY RECORDING MEDIUM

(71) Applicant: LAPIN CREATE, INC., Nerima-ku, Tokyo (JP)

(72) Inventor: Masaru Watanabe, Tokyo (JP)

(73) Assignee: LAPIN CREATE, INC., Nerima-Ku, Tokyo (JP)

( * ) Notice: Subject to any disclaimer, the term of this patent is extended or adjusted under 35 U.S.C. 154(b) by 0 days.

(21) Appl. No.: 15/108,133

(22) PCT Filed: Dec. 25, 2014

(86) PCT No.: PCT/JP2014/084210
§ 371 (c)(1),
(2) Date: Jun. 24, 2016

(87) PCT Pub. No.: WO2015/098995
PCT Pub. Date: Jul. 2, 2015

(65) Prior Publication Data
US 2016/0330822 A1 Nov. 10, 2016

(30) Foreign Application Priority Data
Dec. 27, 2013 (JP) .................. 2013-272493

(51) Int. Cl.
*H05B 33/08* (2006.01)
*G06K 7/14* (2006.01)
*H05B 37/02* (2006.01)

(52) U.S. Cl.
CPC ..... *H05B 37/0272* (2013.01); *H05B 33/0803* (2013.01); *H05B 33/0815* (2013.01); *H05B 33/0857* (2013.01); *H05B 37/0227* (2013.01)

(58) Field of Classification Search
CPC ............ H05B 33/0803; H05B 33/0815; H05B 33/0857; H05B 33/0845; H05B 37/0272;
(Continued)

(56) References Cited

U.S. PATENT DOCUMENTS

2003/0037977 A1 2/2003 Tatara et al.
2003/0057887 A1 3/2003 Dowling et al.
(Continued)

FOREIGN PATENT DOCUMENTS

JP 3073098 U 11/2000
JP 2003-36981 A 2/2003
(Continued)

OTHER PUBLICATIONS

Notification of Transmittal of Translation of the International Preliminary Report on Patentability (Chapter II of the Patent Cooperation Treaty) (Forms PCT/IB/338 and PCT/IPEA/409) dated Jun. 30, 2016, by the European Patent Office in the international Application No. PCT/JP2014/084210. (6 pages).
(Continued)

*Primary Examiner* — Douglas W Owens
*Assistant Examiner* — Raymond R Chai
(74) *Attorney, Agent, or Firm* — Buchanan Ingersoll & Rooney PC

(57) ABSTRACT

There is provided a portable light-emitting apparatus including: a near-field wireless communication unit for transmitting and receiving a light emission mode to and from another light-emitting apparatus; and a switching unit for starting control of the light-emitting apparatus according to the light emission mode received by the near-field wireless communication unit in response to a switching instruction originating from at least one of an action using the light-emitting apparatus and an action using another light-emitting apparatus. As one example, when a switching instruction is
(Continued)

outputted by touching another light-emitting apparatus, it is possible for a plurality of light-emitting apparatuses to successively emit light in the manner of a torch relay.

16 Claims, 7 Drawing Sheets

(58) Field of Classification Search
CPC ............. H05B 37/0227; F21V 23/0414; F21V 21/406
See application file for complete search history.

(56) References Cited

U.S. PATENT DOCUMENTS

| | | | | |
|---|---|---|---|---|
| 2006/0097660 | A1* | 5/2006 | Scott | H05B 37/0272 315/291 |
| 2011/0263329 | A1* | 10/2011 | Miyazaki | G06F 3/0346 463/36 |
| 2012/0004031 | A1* | 1/2012 | Barney | A63F 13/06 463/31 |
| 2012/0098465 | A1 | 4/2012 | Rothschild | |
| 2013/0013091 | A1* | 1/2013 | Cavalcanti | H05B 37/0272 700/90 |
| 2013/0241432 | A1 | 9/2013 | Ebihara et al. | |
| 2014/0132181 | A1* | 5/2014 | Gerszberg | H05B 33/0857 315/292 |
| 2014/0273811 | A1* | 9/2014 | Czapla | H04H 20/61 455/3.06 |
| 2017/0135165 | A1* | 5/2017 | Lu | H05B 33/086 |

FOREIGN PATENT DOCUMENTS

| | | |
|---|---|---|
| JP | 2005-63265 A | 3/2005 |
| JP | 3169089 U | 7/2011 |
| JP | 2011-239854 A | 12/2011 |
| JP | 2013-4323 A | 1/2013 |
| WO | 2013/021209 A1 | 2/2013 |

OTHER PUBLICATIONS

International Search Report (PCT/ISA/210) dated Feb. 24, 2015, by the Japanese Patent Office as the International Searching Authority for International Application No. PCT/JP2014/084210.

International Preliminary Examination Report (PCT/IPEA/409) dated Dec. 24, 2015, by the Japanese Patent Office as the International Searching Authority for International Application No. PCT/JP2014/084210.

Extended European Search Report dated Jul. 25, 2017 issued in corresponding European Patent Application No. 14874851.0 (11 pages).

\* cited by examiner (a)

(b)

(c)

(a)

(b)

(c)

(d)

LIGHT-EMITTING APPARATUS WITH NEAR FIELD COMMUNICATION UNIT, A CONTROL METHOD THEREFOR, AND A NON-TRANSITORY RECORDING MEDIUM

TECHNICAL FIELD

The present invention relates to a portable light-emitting apparatus.

BACKGROUND ART

Japanese Laid-open Patent Publication No. 2003-36981 discloses a performance light-emitting apparatus capable of reproducing arbitrary characters, images, and designs in light at audience seating and a performance method that uses such apparatuses. The screen of a personal computer of a light emission state control apparatus is divided up, the respective divided regions are assigned addresses, and color data and addresses of the respective regions for an image generated on the screen of the personal computer are generated by an image/address data converting apparatus and wirelessly transmitted by a transmitter. The area of audience seating at a venue of a concert or the like is divided up, and seats in a region that corresponds to a divided region of the personal computer screen are assigned the same address. Wireless penlights that have been set such address are lent to audience members at the seats in question. A signal is received by a receiver, and based on color data received together with the corresponding address, an LED driving control circuit has a light-emitting unit emit red, green, and blue light so that an image that is the same as the image displayed on the personal computer screen is displayed by penlights at the audience seating.

DISCLOSURE OF THE INVENTION

At a concert venue or the like, there is demand for an apparatus that enables audience members to enjoy a light show of high entertainment value.

One aspect of the present invention is a portable light-emitting apparatus, as examples, a light-emitting or lighting apparatus, such as a penlight, with a light-emitting portion and a grip portion connected to the light-emitting portion, a communication terminal, such as a smartphone and a wearable terminal, including a display unit that generates light. This light-emitting apparatus includes: a near-field wireless communication unit for transmitting and receiving a light emission mode to and from another light-emitting apparatus; and a switching unit for starting control of the light-emitting apparatus according to the light emission mode received by the near-field wireless communication unit in response to a switching instruction originating from at least one of an action using the light-emitting apparatus and an action using another light-emitting apparatus.

When another light-emitting apparatus enters a communication range of the near-field wireless communication unit of the present light-emitting apparatus and a user holding the present light-emitting apparatus or another user holding the other light-emitting apparatus performs some kind of action, a switching instruction is issued and the present light-emitting apparatus is controlled according to the same light emission mode as the other light-emitting apparatus. As one example, in a state where the light-emitting portion of the light-emitting apparatus is off and the other light-emitting apparatus is emitting light of a predetermined color or display state, by performing an operation (or "action", "performance", or "act") where the present light-emitting apparatus contacts the other light-emitting apparatus or the other light-emitting apparatus throws light, or performing an action where the present light-emitting apparatus takes over light, it is possible for the present light-emitting apparatus to start emitting light with the same color or display state as the other light-emitting apparatus. In addition, by performing an action where the present light-emitting apparatus contacts yet another light-emitting apparatus or throws light toward the next light-emitting apparatus, it is possible for the next light-emitting apparatus to also emit light with the same color or display state. This means that it is possible for a plurality of light-emitting apparatuses to successively emit light in the manner of a torch relay, and for a large number of users to enjoy a light-emitting process of high entertainment value.

The light-emitting mode is not limited to lighting the light-emitting portion and may extinguish the light-emitting portion, and may change the display state, including the color of the light-emitting portion. When the light-emitting portion is on, the light-emitting apparatus is also capable of propagating a light emission mode where the light-emitting portion is turned off, while when the light-emitting portion is in a display or lit state, it is possible to propagate the displaying of a different display or color. The light-emitting apparatus may include a memory for storing a received light emission mode; and a transmission unit for starting, in response to a switching instruction, transmission by the near-field wireless communication unit of the light emission mode stored in the memory.

The near-field wireless communication unit (or "near-field communication unit") may be a near-field wireless communication unit (NFC) such as Bluetooth (registered trademark) or may be a near-field optical communication unit that uses visible light communication, infrared communication, or the like, and should preferably be capable of transmitting and receiving data to and from other apparatuses in a range that can be seen by the human eye or a range that can be reached by the hand.

The light-emitting apparatus may include a first detecting unit that outputs a switching instruction (or "switching signal") when another light-emitting apparatus is contacted. The light-emitting apparatus may further include: a sensor that detects movement of the light-emitting apparatus; and a second detecting unit that generates the switching instruction when the sensor has detected an action that used the light-emitting apparatus. In addition, the light-emitting apparatus may include a switching instruction transmitting unit that transmits the switching instruction using the near-field wireless communication unit. Examples of the sensor that detects movement of the light-emitting apparatus are an acceleration sensor and a magnetic sensor, and the sensor only needs to detect an operation (or "action") that uses the light-emitting apparatus to throw light toward another light-emitting apparatus, or to detect a performance that receives or takes over light from another light-emitting apparatus. The user is capable of holding the light-emitting apparatus and lighting or extinguishing another light-emitting apparatus by touching the apparatuses together in the manner of like a torch relay and a fire relay or performing an operation that throws a flame or light.

The light-emitting apparatus may further include a unit that sets a new light emission mode. The user is capable of creating a light emission mode that is relayed to other light-emitting apparatuses.

The light-emitting apparatus may include a far-field wireless communication unit for receiving information transmitted from a further distance than a communication range of the near-field wireless communication unit; and a control unit for switching operations of the light-emitting apparatus according to an operation mode received by the far-field wireless communication unit. The control unit may include a function that receives a light emission mode to be relayed, from the far-field wireless communication unit. The operation mode may include a relay mode that controls the light-emitting apparatus according to the received light emission mode. It is possible to collectively control the operation of a plurality of light-emitting apparatuses via the far-field wireless communication unit. As one example, it is possible to first extinguish the light-emitting apparatuses held by a plurality of users at a venue via a wireless operation, then have the host light the apparatus of an appropriate user using an apparatus that functions as an igniting torch, and then have the emission of light propagated in the periphery of a torch relay. Also, instead of carrying out control in the manner of a torch relay, it is possible to carry out control that collectively changes the display (or "emission of light") by apparatuses of a plurality of users.

Another aspect of the present invention is a system including a plurality of the light-emitting apparatuses described above. The system may further include a system control unit that transmits the information to be received by a light-emitting apparatus via a far-field wireless communication unit.

Yet another aspect of the present invention is a control method for a portable light-emitting apparatus, including the following steps.
1. Transmitting and receiving a light emission mode to and from another light-emitting apparatus using a near-field wireless communication unit.
2. Starting control of the light-emitting apparatus according to the light emission mode received by the near-field wireless communication unit in response to a switching instruction originating from at least one of (at least any among) an action using the light-emitting apparatus and an action using the other light-emitting apparatus.

The control method may further include: storing the received light emission mode in a memory; and starting, in response to a switching instruction, transmission by the near-field wireless communication unit of a light emission mode stored in the memory.

The control method may further include outputting the switching instruction when the other light-emitting apparatus is contacted, and/or generating the switching instruction when a sensor, which detects movement of the light-emitting apparatus, has detected an action that uses the light-emitting apparatus. The switching instruction may be transmitted by the near-field wireless communication unit.

The control method may further include switching operations of the light-emitting apparatus according to an operation mode received by a far-field wireless communication unit, which receives information transmitted from a further distance than a communication range of the near-field wireless communication unit.

When a light-emitting apparatus includes computer resources such as a CPU and memory, the control method can be provided as a program (or program product) that controls the CPU. One example is a mobile terminal including a display apparatus such as a liquid crystal panel. It is possible to use the display unit as a light-emitting unit, and a program (or program product) for a mobile terminal includes instructions for transmitting and receiving a light emission mode to and from another mobile terminal using a near-field wireless communication unit and for starting control of the light-emitting apparatus according to the light emission mode received by the near-field wireless communication unit in response to a switching instruction originating from at least one of an action using the present mobile terminal and an action using another mobile terminal. Such program (or program product) can be provided via the Internet.

DETAIL DESCRIPTION OF THE INVENTION

Figure 1:
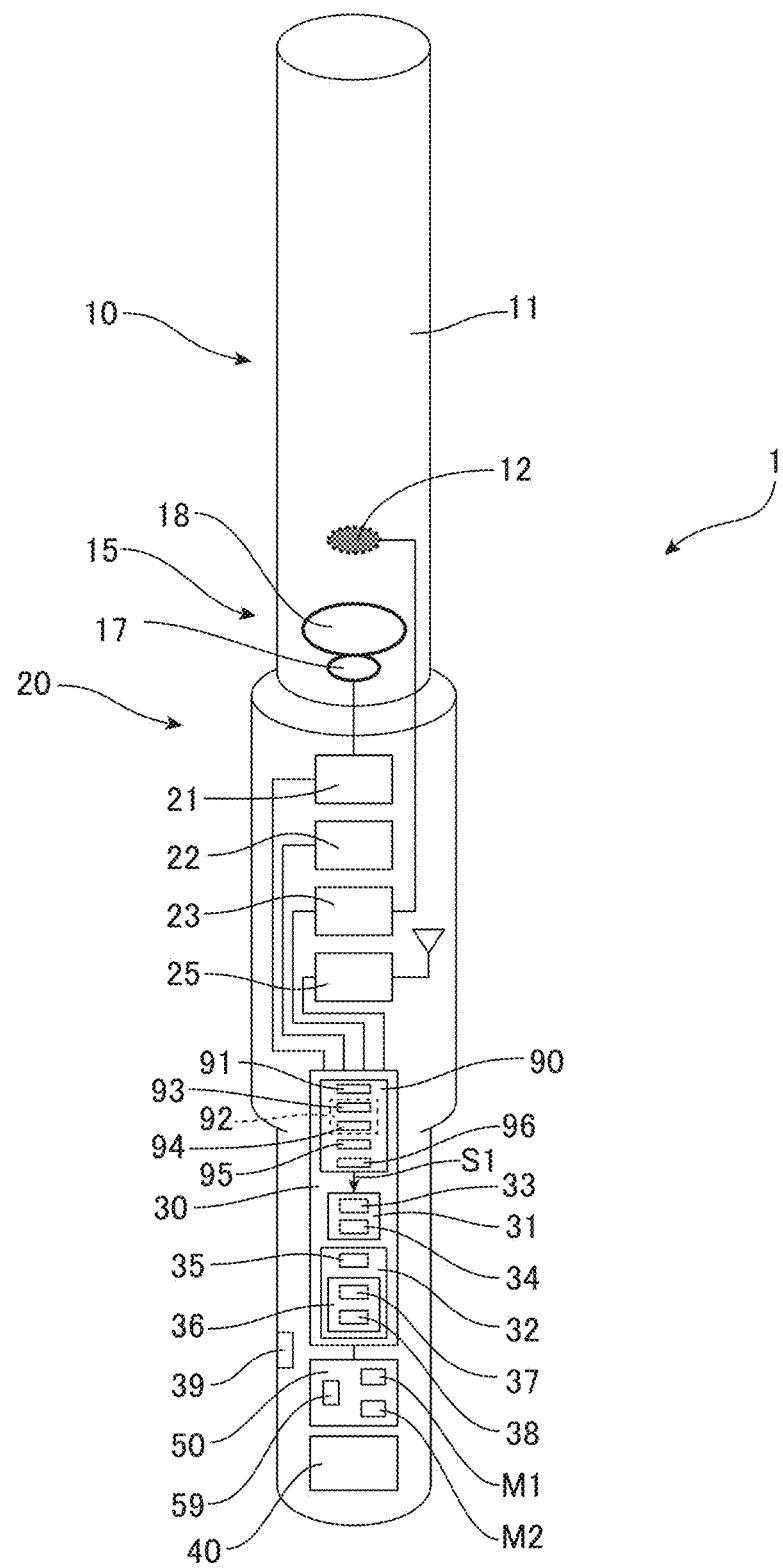
FIG. 1 is a diagram showing the overall configuration of a penlight.

FIG. 1 shows a penlight as one example of a light-emitting apparatus (light-emitting device). This penlight 1 has the overall form of a narrow cylinder or rod, with an upper half as a light-emitting portion 10 and a lower half forming a grip (or "holding portion") 20 that is connected to the light-emitting portion 10. The light-emitting portion 10 includes a translucent or transparent housing 11, a light-emitting element or elements housed inside the housing 11, which in the present embodiment is the LED 12, and a light receiving-and-emitting unit 15 that uses near field communication (or short distance communication). Examples of near-field communication are visible light communication and infrared communication.

FIGS. 2(a) and (b) show an example of the light receiving-and-emitting unit 15. The light receiving-and-emitting unit 15 that transmits and receives information includes a sensor matrix 17 including a photo-sensor or sensors for receiving light and a light-emitting element (an LED for visible light communication or an LED for infrared communication) and a reflector 18 that inputs and outputs the visible light or infrared light that is the communication medium into and out of the sensor matrix 17. By adjusting the sensitivity of the photo-sensor of the sensor matrix 17 and the output of the light-emitting element used for communication, the light receiving-and-emitting unit 15 performs communication over a limited distance of several tens of centimeters that can be reached by extending the user's hand. In a system where light is relayed by touching, it is desirable for the communication distance of the light receiving-and-emitting unit 15 to be in a range of 20 to 100 cm. In a system where light is thrown around, it is desirable for the communication distance of the light receiving-and-emitting unit 15 to be a distance of several meters to several tens of meters over which light can be visually confirmed. The communication distance of the light receiving-and-emitting unit 15 can be adjusted by controlling the sensitivity of the sensor matrix 17, for example.

Figure 2:
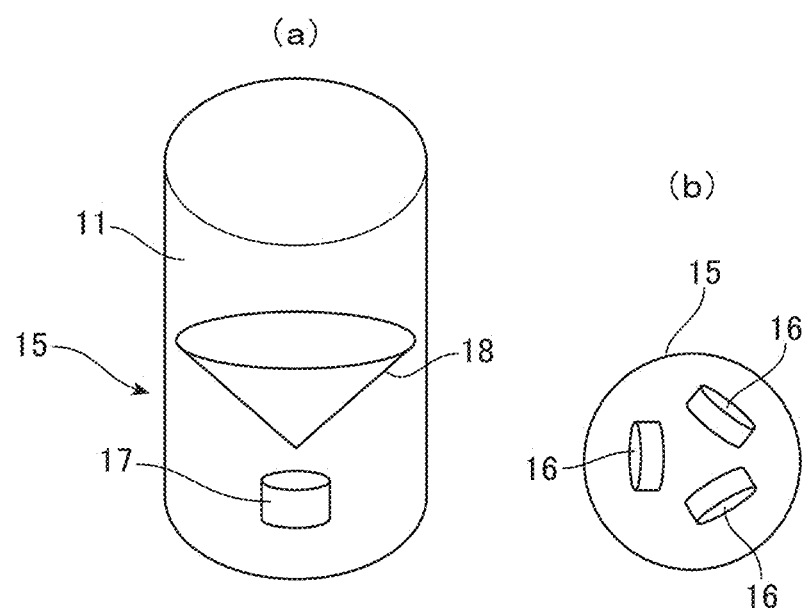
FIG. 2 is a diagram showing a light receiving/emitting unit for near-field communication.

As shown in FIG. 2(b), a different example of the light receiving-and-emitting unit 15 has a plurality of sensor units 16 including photo-sensors for receiving light and LEDs laid out around the circumference. The light receiving-andemitting unit 15 shown in FIGS. 2(*a*) and (*b*) is a type capable of communicating substantially uniformly with other penlights 1 in all directions around the axis of the penlight 1. The light receiving-and-emitting unit 15 may be a near-field wireless communication unit that has directivity, and as one example, may be orientated so as to be capable of communicating in the axial direction of the penlight 1. It is possible to designate and communicate with other penlights 1. The communication distance (or "communication range") may have a specified distribution, so that the penlight 1 may communicate with penlights 1 faraway by designating specified penlights 1 and may communicate with penlights 1 nearby with comparatively little directivity.

As a light-emitting element for visible light communication, it is possible to use the LEDs 12 that light (light up and color) the housing 11 of the light-emitting portion 10. Also, a near-field wireless communication system that can be installed in the penlight 1 is not limited to visible light communication and infrared communication, and may be wireless communication (such as NFC or ZigBee) that uses low-power radio waves or may be communication that uses another medium, such as sound waves.

The penlight 1 includes a near-field wireless communication unit (or "near-field communication unit") 21 that transmits and receives information (data) via the light receiving-and-emitting unit 15, a touch sensor (or "touch detecting unit") 22, a driving unit (or "LED driver") 23 that controls the light-emitting LEDs 12, and a wireless communication unit 25 that communicates over a longer distance than the near-field communication unit using radio waves of an appropriate frequency band. Examples of the touch sensor 22 include an acceleration sensor (G sensor), a vibration switch, an induction switch (a combination of a reed switch and a magnet coil), and a magnetic sensor, and it is sufficient for the penlight 1 to be capable of sensing that the penlight 1 has touched another penlight or another object (or person). The touch sensor 22 according to the present embodiment is an acceleration sensor 22 and also functions as an action detection sensor (or "performance detection sensor") that detects movement of the grip portion 20.

One example of the wireless communication unit 25 has a range of communication of around 10 to 100 m or further like a "wireless LAN" or "Wi-Fi". The wireless communication unit 25 may be capable of exchanging information over a relatively large distance (a so-called "far field") compared to the range of communication of the near-field wireless communication unit 21.

The penlight 1 further includes a CPU 30, a memory 50, and a battery 40. A program (or program product) 59 executed by the CPU 30 is stored in the memory 50, and by executing the program 59, the CPU 30 operates as a control unit equipped with various functions. One of the functions realized by the CPU 30 is a function that controls the emission (outputting) of light by the light-emitting portion 10, more specifically the LEDs 12, in accordance with a light emission mode M. More specifically, the CPU (or "control unit") 30 includes a first function 31 that controls the light-emitting portion 10 according to a light emission mode M acquired by the near-field communication unit 21, a second function 32 that controls the light-emitting portion 10 according to a light emission mode M acquired by the wireless communication unit 25, and an action detecting unit 90 that detects an action and outputs a switching instruction ("change-over instruction", or "switching signal", "operation instruction"), and controls the first function 31.

In the present specification, the expression "light emission mode" refers to information (data) that controls and sets (defines) the method, design, state, color, order, and the like of light emitted by the penlight 1 (the light-emitting portion 10 of the penlight 1). The light emission mode may be transmitted as numeric information (light emission IDs), may be transmitted using a command including characters, or may be appropriate information (data) that can be interpreted by other penlights.

The action detecting unit 90 includes a touch detecting unit (or "first detecting unit") 91 that detects, using the acceleration sensor 22, whether the penlight (present penlight, penlight itself) 1 has touched another penlight 1 and outputs the switching instruction S1 and a second detecting unit 92 that detects that an operation (or "action" or "performance") where the user moves the penlight (user's penlight) 1 to control the light of the penlight 1 or the light (light emission) of another penlight 1 has been performed and outputs the switching instruction S1.

The second detecting unit 92 includes a third detecting unit 93 that detects whether the user has moved the present penlight 1 to control the present penlight 1 in the manner of receiving or pulling away light (an action that controls the present penlight 1 or "internal operation instruction" or "internal trigger"), and a fourth detecting unit 94 that detects whether the user has moved the present penlight 1 so as to control another penlight 1 in the manner of throwing light or throwing the penlight itself (an action that controls another penlight 1 or "external operation instruction" or "external trigger").

The action detecting unit 90 further includes a switching instruction transmitting unit (or "switching instruction transferring unit") 95 that transmits (transfers), when the fourth detecting unit 94 has detected an action that controls another penlight 1, a switching instruction (or "switching signal") S1 via the near-field wireless communication unit 21 and a switching instruction receiving unit 96 that receives a switching instruction S1 from another penlight 1 via the near-field wireless communication unit 21.

The light emission mode M (light emission ID) to be reflected or used in the light-emitting portion 10 by the switching instruction S1 includes a plurality of IDs that specify a plurality of display states including turning the light-emitting portion 10 on and off (or "lighting" and "extinguishing" the light emitting portion 10). The display states controlled by a light emission mode M include lighting with white light, lighting with a predetermined color, repeatedly displaying a plurality of colors according to a predetermined algorithm or randomly, and fading in and fading out when switching colors. The light emission mode M (or "light emission ID") only needs to be able to specify a state (or "operation", "display", or "control") that can be realized by the LED 12 of the light-emitting portion 10 and the driving unit 23. The light emission mode M that includes any of a plurality of IDs showing a plurality of display forms is provided or transmitted by the communication unit 21 or 25 and the light-emitting apparatus 1 emits light according to the transmitted light emission mode M in response to the switching instruction S1. In addition, the penlight 1 includes an interface 39 that enables the user to set a light emission ID, which makes it possible for the user to set a desired light emission mode M in the memory 50.

The first function (or "first function unit" or "first unit") 31 includes a first light emission mode receiving function (or "first light emission mode receiving unit") 33 that stores a light emission mode M received via the near-field communication unit 21 as the light emission mode M2 for the next light emission ("received light emission mode" or "next light emission mode") and a first switching function (first switching unit, first change-over unit) 34 that starts control of the light-emitting portion 10 according to the received light emission mode M2 to change the light emission state of the light-emitting portion 10. When the action detecting unit 90 has detected an action and outputted the switching instruction S1 that is an operation instruction, the first switching unit 34 sets the next light emission mode M2 as the active light emission mode M1 to control the light-emitting portion 10. The first switching unit 34 includes a function as a transmission function (or "transmission unit") that outputs information including the active light emission mode M1 via the near-field wireless communication unit 21 at the same time as, or before or after, such control.

That is, the penlight (or "light-emitting apparatus") 1 includes the near-field wireless communication unit 21 and the control unit 30 that controls the operation of the light-emitting portion 10 when an operation instruction originating from movement of another apparatus has been detected. The control unit 30 includes a function 33 that stores, when the near-field communication unit 21 has received first information including an active light emission mode M of the light-emitting portion of another apparatus, the received light emission mode in the memory 50 and the first function 31 that controls, when the action detecting unit (or "external operation detecting unit") 90 has detected contact with another apparatus or the like, the light-emitting portion 10 of the penlight 1 according to a received light emission mode and outputs information including the active light emission mode M using the near-field wireless communication unit 21.

The second function (or "second function unit" or "second unit") 32 includes a second switching function (or "second switching unit", "second change-over unit" "wireless control function", or "wireless control unit") 35 that controls the light-emitting portion 10 with the light emission mode M received via the wireless communication unit 25 as the active light emission mode M1 and a third function (or "third unit") 36 that controls operation switching of the light-emitting portion 10 in response to the switching instruction S1 outputted on the action detecting unit 90 detecting an action. The third function 36 includes a second light emission mode receiving function 37 that stores the light emission mode M received via the wireless communication unit 25 in the memory 50 as the light emission mode M2 for the next emission of light ("received light emission mode" or "next light emission mode") and a third switching function ("third change-over unit" or "third switching unit") 38 that controls the light-emitting portion 10 by setting the next light emission mode M2 as the mid-operation light emission mode M1 when the action detecting unit 90 has detected an action.

That is, the second information received via the wireless communication unit 25 may include the light emission mode M2 to be executed next. The second function unit 32 includes a function 37 that stores, when the next light emission mode M2 is included in the received second information, such light emission mode M2 in the memory 50 and a third switching function 38 that controls the light-emitting portion 10 of the penlight 1 according to the next light emission mode M2 when the action detecting unit 90 has detected contact with another apparatus or another action. Individual users of the penlights 1 are capable of changing the operation of the light-emitting portions 10 of other users' penlights 1 by touching or contacting the penlights 1 together or carrying out some operation while holding the grip portion 20 of a penlight 1. Also, by performing an operation such as hitting the penlight 1 or contacting the penlight 1 of another user, it is possible to enjoy changes in color or display.

Figure 3:
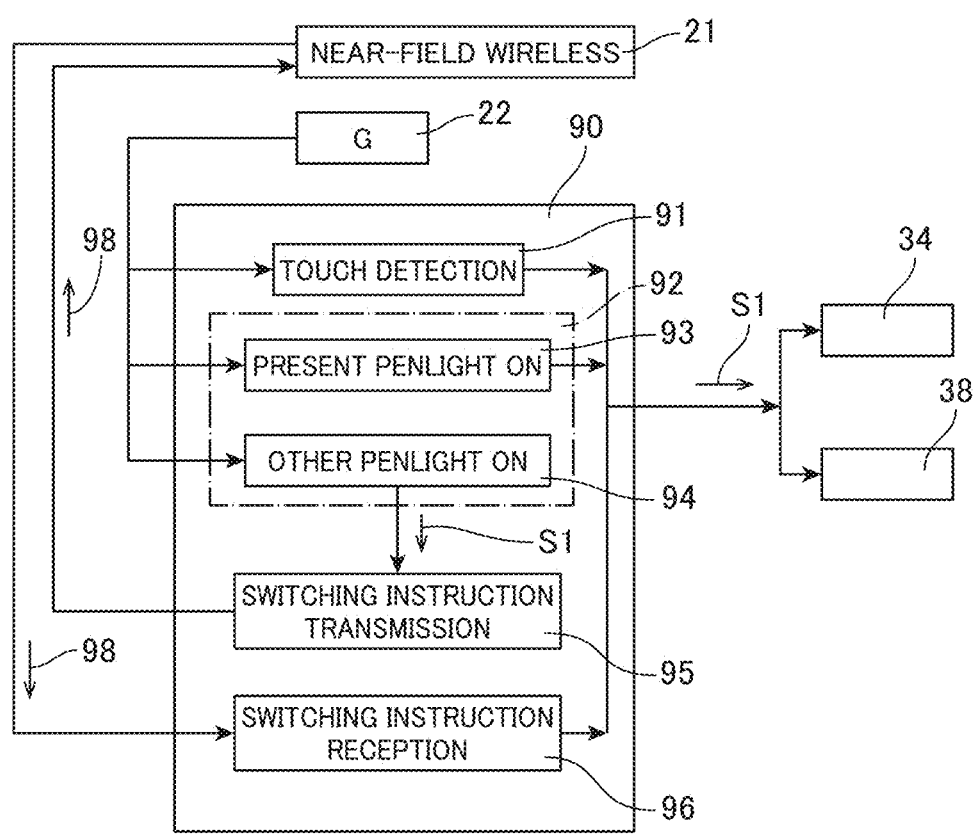
FIG. 3 is a diagram showing the overall configuration of an action detecting unit.

FIG. 3 shows the action detecting unit 90 that indicates the operation of the penlight 1 using a switching instruction S1. The action detecting unit 90 supplies the switching instruction S1 to the first switching unit 34 and the third switching unit 38 in response to a predetermined action using the penlight 1 or a predetermined action that uses another (i.e., another user's) penlight 1. When a touch (contact) with another penlight 1 has been detected by the acceleration sensor 22, the touch detecting unit 91 outputs the switching instruction S1. The touch detecting unit 91 outputs the switching signal S1 by detecting a touch when the user of the present penlight 1 performs an action to touch another user's penlight 1 and when another user performs an action, and when both actions are performed.

On recognizing (detecting), using the acceleration sensor 22, that the user has moved his/her own penlight 1 for example to receive or take over light (or a "flame") from the light-emitting portion 10 of another penlight 1, the third detecting unit 93 outputs the switching instruction S1 and controls the light-emitting portion 10 of the present penlight 1.

On detecting, using the acceleration sensor 22, that the user has held the grip portion 20 and performed an action such as throwing or letting go of the light-emitting portion 10 toward another user, the fourth detecting unit 94 outputs the switching instruction S1 to the switching instruction transmitting unit (or "switching instruction transferring unit") 95. An action that evokes the image of the light (or "flame") of the light-emitting portion 10 flying toward the penlight 1 of another user can be detected by the acceleration sensor 22 as a sudden change in acceleration of the grip portion 20. Note that the movements detected by the action detecting unit 90 are merely examples and the present invention is not limited to such.

When the fourth detecting unit 94 has detected an action that indicates an operation of the penlight 1 of another user, the switching instruction transmitting unit 95 transmits information (or "first information", "operation command", "operation indicating command", or simply "command") 98 including the switching instruction (or "operation instruction") S1 via the near-field wireless communication unit 21 to the other penlight 1. On receiving the operation command 98, from another penlight 1 via the near-field wireless communication unit 21, the switching instruction receiving unit 96 supplies the switching instruction S1 to the first switching unit 34 and the third switching unit 38.

Figure 4:
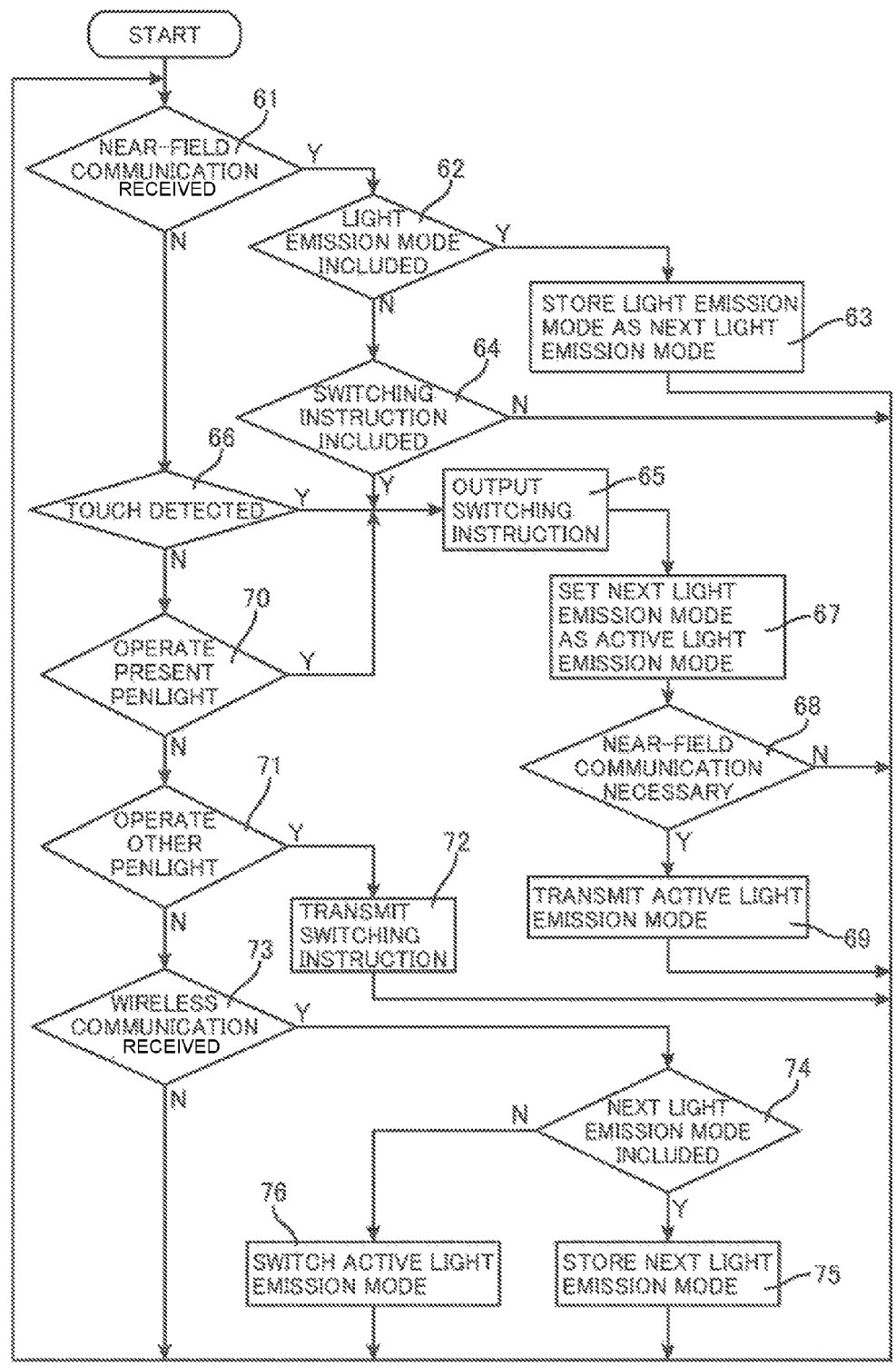
FIG. 4 is a flowchart showing control of a penlight.

FIG. 4 shows an example control method of the penlight 1. This control method is provided as a program 59 and is executed by being loaded into the CPU 30. In step 61, the near-field wireless communication unit 21 receives information, and in step 62, if information (first information) having the light emission mode M is included, in step 63, the light emission mode M received by the first light emission mode receiving unit 33 is stored in the memory 50 as the next light emission mode M2. The light emission mode M received via the near-field wireless communication unit 21 is the light emission mode M that is active at another penlight 1 present within a distance where the near-field wireless communication unit 21 can communicate.

In step 64, if a switching instruction S1 is included in the information received by the near-field wireless communication unit 21, in step 65 the switching instruction receiving unit 96 outputs the switching instruction S1. In step 66, if the action detecting unit 90 detects a touch, the switching instruction S1 is outputted. In step 70, if the action detecting unit 90 detects an action that operates the present penlight 1, the switching instruction S1 is outputted. In response to the switching instruction S1, in step 67 the first switching unit 34 or the third switching unit 38 sets the next light emission mode M2 stored in the memory 50 as the active light emission mode M1 and controls the light-emitting portion 10. As one example, if the received light emission mode M2 is a mode that illuminates the light-emitting portion 10 like a flame, by touching another penlight 1, the received light emission mode M2 is set as the active light emission mode M1 and the light-emitting portion 10 displays the colors and flickering of a flame.

In step 68, if the near-field wireless communication unit 21 is in a state where communication is possible, in step 69 the first switching unit 34 transmits information (communication packets) for near-field communication including the active light emission mode M1 to another penlight 1 in the periphery.

In step 71, when the action detecting unit 90 detects an action that operates the penlight 1 of another user, in step 72, the switching instruction transmitting unit 95 generates the operation instruction command 98 that includes the switching instruction S1 and transmits the operation instruction command 98 toward other penlights 1 in the periphery.

In step 73, when the wireless communication unit 25 receives information (or "second information" or "wireless communication packets") including the light emission mode M, in step 74, the second function unit 32 determines, from information included in the wireless communication packets, whether the received light emission mode M is the light emission mode M1 to be made active immediately or the next light emission mode M2. If the received mode is the next light emission mode M2, in step 75 the light emission mode M received by the second light emission mode M receiving unit 37 is stored in the memory 50 as the next light emission mode M2. On the other hand, if the received light emission mode M is a light emission mode M to be made active immediately, in step 76 the second switching unit 35 controls the light-emitting portion 10 with the received light emission mode M as the active light emission mode M1. As one example, if the received light emission mode M to be made active immediately is an extinguish mode, the second switching unit 35 extinguishes the light-emitting portion 10.

The second function unit 32 includes a function for receiving and interpreting a command that includes the light emission mode M or does not include the light emission mode M and indicates another operation. As one example, by receiving a command via the wireless communication unit 25, it is possible to switch the operation mode of the penlight 1 to a mode where the light emission state changes when an action is detected or to a mode where the light emission state changes when a wireless instruction is received without an action being detected, and to switch to a mode where the user voluntarily operates the penlight 1 locally without actions being detected.

Figure 5:
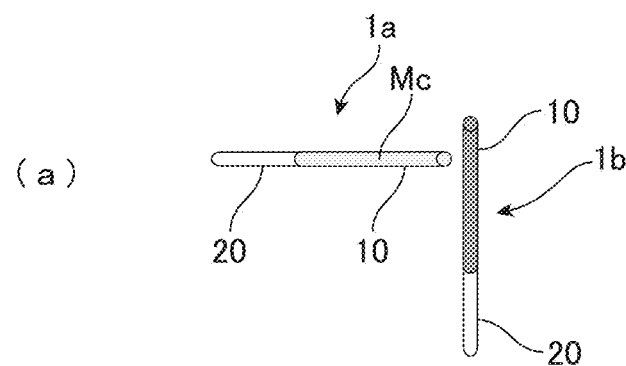
FIG. 5 shows how emission of light is transmitted between penlights.
Figure 5:
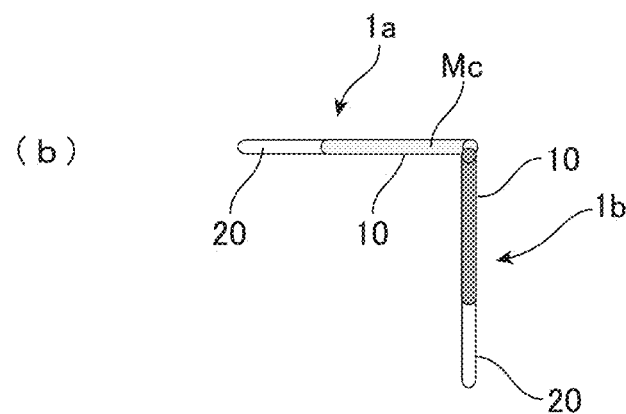
Figure 5:
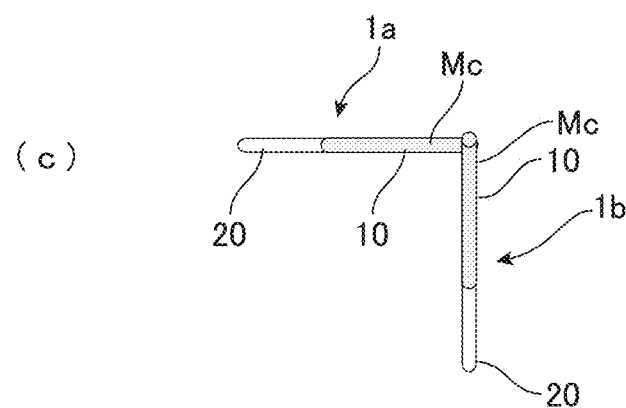

FIG. 5 shows how a plurality of penlights 1 are lit in the manner of a torch relay. As one example, the penlight 1 has a size and construction that enable the penlight 1 to be safely swung around, that is, with a length of 250 mm or less, the diameter of the light-emitting portion 10 is around 15 mm, the diameter of the appliance portion (grip portion) 20 is around 25 mm or less to make the penlight 1 easy to hold, one or more AAA batteries 40 is internally provided, and a circuit board on which the CPU 30 and the memory 50 are mounted can be compactly provided in a size of around 15 by 40 mm, which can be easily housed in the grip portion 20.

As shown in FIG. 5(a), a penlight 1a emits light according to a light emission mode (electronic candle light emission mode) Mc where a flickering light of amber colors is emitted to resemble a flame. When penlight 1a belonging to another user is brought close to the present penlight 1b and enters the communication range (as one example, a distance that can be reached by the hand) of the near-field wireless communication unit 21 that uses visible light or infrared light as a communication medium, the present penlight 1b receives communication packets including the light emission mode Mc and stores the received light emission mode Mc as the next light emission mode M2.

As shown in FIG. 5(b), when the penlight 1a of another user touches the present penlight 1b, the first switching unit 34 of the present penlight 1b starts controlling the light-emitting portion 10 with the light emission mode Mc that has just been received as the active light emission mode M1. Accordingly, as shown in FIG. 5(c), the present penlight 1b emits light according to the electronic candle light emission mode Mc. At the same time, the first switching unit 34 outputs communication packets that include the active light emission mode Mc to the periphery via the near-field wireless communication unit 21. This means that when the present penlight 1b is brought close to and touches the penlight 1 of yet another user, such penlight also emits light according to the electronic candle light emission mode Mc.

On receiving a light emission mode (light emission ID) using near-field communication, the penlight 1 on the receiver side enters a standby mode for light emission and light emission is turned on when a touch is detected by the acceleration sensor 22. At this timing, transmission of the light emission mode is also turned on. This means that by using the penlight 1, instead of having the switching of individual penlights 1 carried out at each penlight 1, it is possible to have the penlight 1 of another user emit light with the same display state as the present penlight 1 through a collaborative operation with another user or via an instruction from another user, in the present embodiment, by touching the light-emitting portions 10 of individual penlights 1 together.

Figure 6:
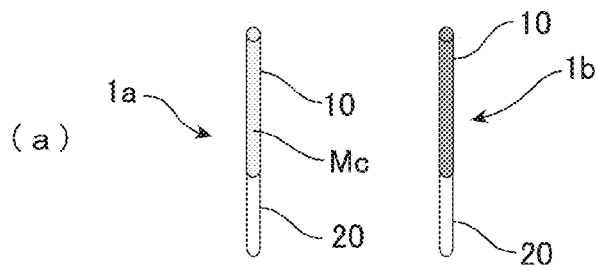
FIG. 6 shows a different example of how emission of light is transmitted between penlights.
Figure 6:
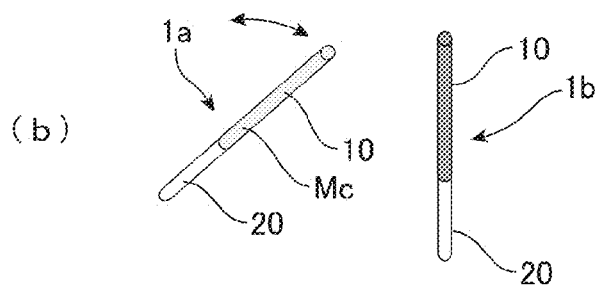
Figure 6:
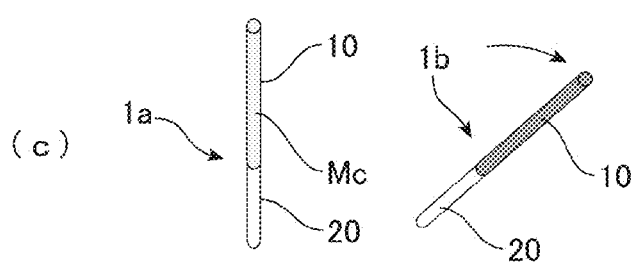
Figure 6:
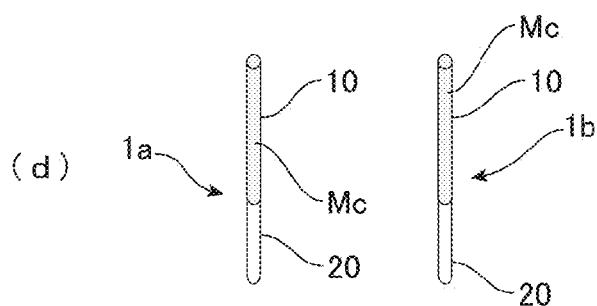

FIG. 6 shows a different example of how a plurality of penlights 1 are lit. As shown in FIG. 6(a), when the penlight 1a of another user is brought close to the present penlight 1b and enters the communication range of the near-field communication unit 21, for example, a distance that can be clearly seen by the eye (human vision), the present penlight 1b receives communication packets including the light emission mode Mc and stores the communication packets in the memory 50.

As shown in FIG. 6(b), when the other user shakes the penlight 1a in the direction of the present penlight 1b, the action detecting unit 90 of the penlight 1a detects such action and the switching instruction transmitting unit 95 transmits a command 98 including the switching instruction S1 via the near-field communication unit 21.

As shown in FIG. 6(d), on receiving the command 98 including the switching instruction S1, the switching instruction receiving unit 96 of the present penlight 1b outputs the switching instruction S1 so that the present penlight 1b emits light according to the same light emission mode Mc as the penlight 1a of the other user. Together with this, the first switching unit 34 outputs communication packets including the active light emission mode Mc via the near-field communication unit 21 to the periphery. This means that when the present penlight 1b is shaken in the direction of yet another penlight 1, such penlight 1 will also emit light with the same light emission mode Mc as the penlight 1.

As shown in FIG. 6(c), when the present penlight 1b is shaken so as to receive light from the penlight 1a of another user, the action detecting unit 90 of the present penlight 1b outputs the switching instruction S1. Accordingly, in the same way as FIG. 6(d), the present penlight 1b emits light according to the same light emission mode Mc as the penlight 1a of another user.

Accordingly, by shaking the penlight 1 toward other users so as to throw light, it is possible to have penlights 1 located nearby or at some distance successively lit with the same color or pattern. It is also possible to extinguish other penlights 1. By holding the penlight 1 and performing an action such as receiving light, it is possible to light the penlight 1 with the same color or pattern as a penlight 1 located nearby or at some distance.

In addition, it is possible to transmit light between penlights 1 when the movement of the present penlight 1b and the penlight 1a of another user are synchronized, as one example, when a throwing motion and a receiving motion are synchronized. As one example, it is possible to carry out control that switches the light emission mode when the timing of reception of the command 98 including a switching instruction S1 by the near-field communication unit 21 and the timing of output of a switching instruction S1 according to an action of the present penlight 1 match each other within a predetermined time interval. In addition, by limiting the actions to be synchronized or the type of performance, it is possible to have users throw light around in the manner of a game.

Figure 7:
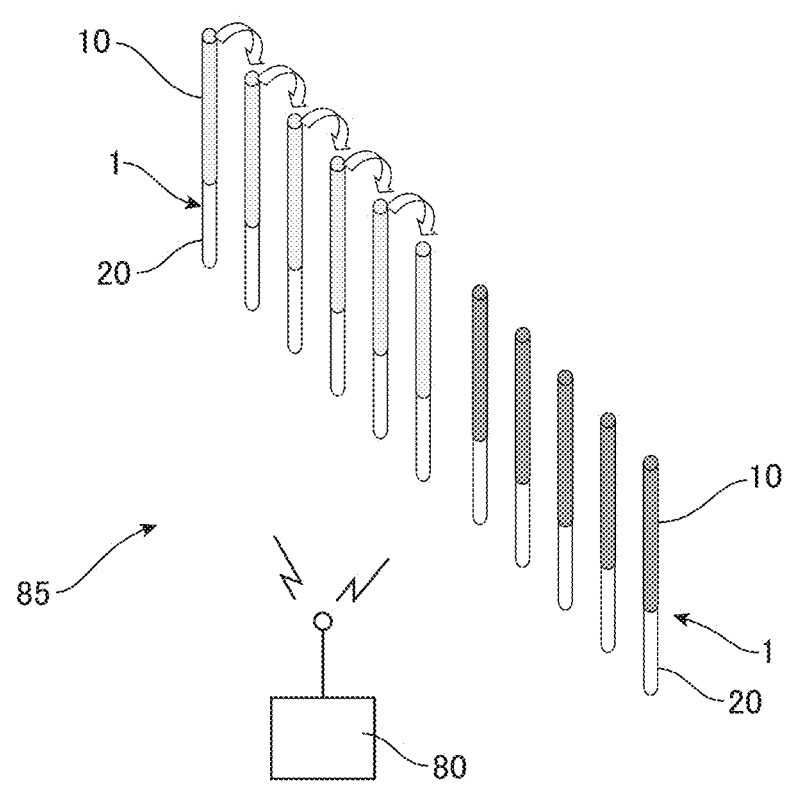
FIG. 7 shows a system including a plurality of penlights.

FIG. 7 shows a system 85 that includes a plurality of penlights 1 and a system control unit 80 that wirelessly transmits communication packets including a light emission mode to control the plurality of penlights 1. First, an extinguish mode is sent from the system control unit 80 to extinguish the plurality of penlights 1. At each penlight 1, the second function unit 32 interprets the extinguish mode as a light emission mode to be immediately executed and the second switching unit 35 switches the operation of the light-emitting portion 10.

Next, a penlight 1 that is already emitting light according to the light emission mode Mc is brought close to and placed in contact with another penlight 1. Alternatively, the penlight 1 is shaken toward another penlight 1. On response to repeating such operations (actions) by the users holding such penlights 1, the users are capable of having penlights 1 successively emit light in the same display state. Accordingly, by carrying out control that senses contact (a "touch") between the penlights as a trigger for lighting a penlight, it is possible for a large number of users to enjoy a performance that is just like a torch relay. It is also possible to transmit light by lighting another penlight 1 in the manner of throwing a flame from a certain distance away, so that many users can enjoy the penlights 1 lighting up one after the other like magic wands.

As described above, it is possible to first extinguish a plurality of penlights 1 and then successively light up the penlights 1 so that users can enjoy a relay of a flame or light of other colors, and also possible to successively extinguish a plurality of penlights 1 that are emitting light. It is also possible to coordinate a specified light emission mode by bringing a plurality of penlights 1 that are emitting light in a different light emission mode close and touching, or by virtually throwing light (or a "flame") around.

This penlight 1 is also capable of receiving a light emission mode M from the system control unit 80 at any time using the wireless communication unit 25 and controlling the emission of light (or color or display) of the penlight 1 according to the light emission mode M. Accordingly, it is possible to synchronize and control the emission of light by a plurality of penlights 1 and to wirelessly send a random light emission mode M so as to have a plurality of penlights 1 emit light with random colors and timing.

It is also possible to transmit the next light emission mode M from the system control unit 80 to the plurality of penlights 1 and by touching penlights 1 together, hitting the penlights 1 with the hand, or shaking the penlights 1, it is possible to have a plurality of penlights 1 independently emit light with the next light emission mode M at different timing. Accordingly, by using a plurality of the penlights 1, it is possible to achieve a various types of performance, with it being possible to create and enjoy a performance that unites the stage and the audience at a concert or event, or a performance that unites different members of the audience.

Although an example of the penlight 1 has been described above, the portable light-emitting apparatus (light-emitting device) only needs to include a part that emits light, and may be a mobile terminal capable of using a display unit such as a liquid crystal display panel as a light-emitting unit. It is also possible to enjoy the same types of performance as described above by downloading into or adding a program including the functions described earlier to a mobile terminal such as a smartphone. It is possible to use a function such as Bluetooth (registered trademark) or infrared communication provided in a smartphone as the near-field communication for the present invention. It is also possible to detect contact between smartphones and to detect other actions using the acceleration sensor provided in a smartphone. Accordingly, it is possible to enjoy a light game such as the torch relay described above and other attractions using smartphones.

A light-emitting apparatus (light-emitting device) including a light-emitting portion that is dedicated to lighting or simply emitting light is not limited to a penlight and may be a light of another shape, such as spherical or disc-shaped, a grip connected to the light-emitting portion may be provided, or the user may directly grip the light-emitting portion. The light-emitting apparatus may also be a wearable terminal including a light or display function, in the form of a wristwatch or the like.

The performances described above are examples of performances that use a light-emitting apparatus according to the present invention, and it is also possible to connect other actions and the transmission and reception of light, and by using the light-emitting apparatus according to the present invention, it is possible to enjoy various performances and games.

The invention claimed is:
1. A portable light-emitting apparatus comprising:
   a near-field wireless communication unit for transmitting and receiving a light emission mode to and from another portable light-emitting apparatus;
   an action detecting unit for outputting a switching instruction originating from at least one of an action using the portable light-emitting apparatus and an action using the other portable light-emitting apparatus;
   a memory configured to store the light emission mode received by the near-field wireless communication unit as a next light emission mode; and a switching unit for starting control of the portable light-emitting apparatus according to the next light emission mode stored in the memory in response to the switching instruction.

2. The portable light-emitting apparatus according to claim 1, further comprising:
a transmission unit configured to start, in response to the switching instruction, a transmission by the near-field wireless communication unit of the light emission mode stored in the memory to another portable light-emitting apparatus as the next light emission mode.

3. The portable light-emitting apparatus according to claim 1,
wherein the action detecting unit includes a first detecting unit configured to output the switching instruction when communication is made with another portable light-emitting apparatus, wherein the communication includes physical contact.

4. The portable light-emitting apparatus according to claim 1,
wherein the action detecting unit includes:
a sensor that detects movement of the portable light-emitting apparatus; and
a second detecting unit configured to generate the switching instruction when the sensor has detected an action that uses the portable light-emitting apparatus.

5. The portable light-emitting apparatus according to claim 4,
wherein the action detecting unit includes:
a switching instruction transmitting unit configured to transmit the switching instruction using the near-field wireless communication unit.

6. The portable light-emitting apparatus according to claim 1, further comprising a unit for setting a new light emission mode.

7. The portable light-emitting apparatus according to claim 1, further comprising;
a far-field wireless communication unit configured to receive information transmitted from a further distance than a communication range of the near-field wireless communication unit; and
a control unit configured to switch operations of the portable light-emitting apparatus according to an operation mode received by the far-field wireless communication unit,
wherein the operation mode includes a mode that immediately controls the portable light-emitting apparatus according to a received light emission mode transmitted by the far-field wireless communication unit.

8. The portable light-emitting apparatus according to claim 7, wherein the control unit includes a function for receiving a light emission mode to be relayed, from the far-field wireless communication unit.

9. A system comprising a plurality of light-emitting apparatuses according to claim 7 and a system control unit for transmitting information to be received by the far-field wireless communication unit.

10. A control method for a portable light-emitting apparatus, comprising:
transmitting and receiving a light emission mode to and from another portable light-emitting apparatus using a near-field wireless communication unit;
storing the light emission mode received by the near-field wireless communication unit as a next light-emission mode in a memory;
outputting a switching instruction originating from at least one of an action using the portable light-emitting apparatus and an action using the other portable light-emitting apparatus; and
starting control of the portable light-emitting apparatus according to the next light emission mode stored in the memory in response to the switching instruction.

11. The control method according to claim 10, further comprising:
starting, in response to the switching instruction, a transmission by the near-field wireless communication unit of the next light emission mode stored in the memory to another portable light-emitting apparatus.

12. The control method according to claim 10,
wherein outputting the switching instruction includes outputting the switching instruction when communication is made with another portable light-emitting apparatus, wherein the communication includes physical contact.

13. The control method according to claim 10,
wherein outputting the switching instruction includes generating the switching instruction when a sensor, which detects movement of the portable light-emitting apparatus, has detected an action that uses the portable light-emitting apparatus.

14. The control method according to claim 13, further comprising transmitting the switching instruction using the near-field wireless communication unit.

15. The control method according to claim 10,
further comprising switching operations of the portable light-emitting apparatus according to an operation mode received by a far-field wireless communication unit that receives information transmitted from a further distance than a communication range of the near-field wireless communication unit, wherein the operation mode includes a mode that immediately controls the portable light-emitting apparatus according to a received light emission mode transmitted by the far-field wireless communication unit.

16. A nontransitory recording medium encoded with a program for a portable mobile terminal that uses a display unit as a light-emitting unit, the program comprising:
transmitting and receiving a light emission mode to and from another portable mobile terminal using a near-field wireless communication unit;
storing the light emission mode received by the near-field wireless communication unit as a next light-emission mode in a memory;
outputting a switching instruction originating from at least one of an action using the portable mobile terminal and an action using the other portable mobile terminal; and
starting control of the portable mobile terminal according to the next light emission mode stored in the memory in response to the switching instruction.

* * * * *